Patented Nov. 21, 1939

2,180,342

UNITED STATES PATENT OFFICE 2,180,342

MANUFACTURE OF MODIFIED ISOCOLLOID PRODUCTS HAVING CONTROLLED SOLUBILITY

Laszlo Auer, Budapest, Hungary, assignor to J. Randolph Newman, Washington, D. C., as trustee No Drawing. Application April 21, 1930, Serial No. 446,174. Renewed February 3, 1936. In Great Britain April 24, 1929

14 Claims. (Cl. 87—12)

The present invention relates to a process for the modification of the physical properties (viscosity, melting point, etc.), of colloidal substances and more specially to a process for the modification of the physical properties of organic isocolloids. By "isocolloids" or "isocolloidal substances" is meant colloidal substances whereof the dispersed phase and the dispersion medium of the colloidal system are both of the same chemical composition but in a different state.

This application is in part a division and in part a continuation of my prior applications Ser. Nos. 143,786 and 359,425, filed October 23, 1926, and April 30, 1929, respectively. In those applications, I disclose methods wherein the properties of isocolloid substances may be advantageously altered by dispersing a minor amount of a polar compound or electrolyte therein. The present application is directed to similar methods wherein the solubility of the modified products is directly controlled and to the products obtained. It is particularly directed to the modification of castor oil and like fatty oils and esters, by my prior methods or the improved methods hereinafter set forth.

Starting materials suitable for the treatment according to the present invention are, inter alia, fatty oils, tung oil, linseed oil, fish oils (train oils), poppyseed oil, sunflower oil, cottonseed oil, rape-seed oil, soya bean oil, pineseed oil, corn oil, olive oil, castor oil, resins, synthetic resins containing natural resins, products containing the acids of fatty oils and resins, their derivatives, heavy mineral oils containing naphthenic acids, tar, asphalt, goudron (petroleum distillation residue), pitches, certain mineral oil products, animal and vegetable waxes, rubber and rubber-like hydrocarbons, also chemical pure isocolloid bodies such, for instance, as styrene, etc.

By my former investigations such as described in Ser. Nos. 143,786 and 359,425 and the various divisions thereof, I have found that the physical properties of natural and artificial isocolloids containing unsaturated carbon compounds may be modified by treating them with certain agents called in this specification "modifying agents". Such modifying agents are, e. g., salts or organic and inorganic acids, metallic derivatives of organic compounds, certain organic acids, compounds comprising within the molecule an acidic inorganic residue and an organic residue. By an acidic inorganic residue I mean such an inorganic residue as can be converted by the addition of one or more hydrogen atoms into an inorganic acid (including carbonic acid as inorganic). It will be seen that this definition includes such compounds as organic halogen derivatives (e. g., trichloroacetic acid, chloral hydrate, iodoform, o-dichlorobenzene, p-dichlorobenzene, trichlorobenzene, mono-chloracetic acid, 4-chloro-o-anisidine, pinene hydrochloride, naphthalene tetrachloride, p-nitrochlorobenzene, benzyl chloride, triphenylchloro-methane, acetyl chloride, benzoyl chloride) organic sulphonic acids and their halides and esters (e. g.—sodium 2:6:8 naphthylaminedisulphonate, sodium 2:6:8 naphtholdisulphonate, sodium 1:8:3:6 aminonaphtholdisulphonate, sodium 1:5 naphtholsulphonate, sodium 2:3:6 naphtholdisulphonate, sodium 2:6 naphtholsulphonate, 2:6 naphthylaminesulphonic acid, 2:1 naphthylaminesulphonic acid, 2-phenylamino - 8 - naphthol - 6 - sulphonic acid, beta-naphthylamine 3:6:8 trisulphonic acid, beta-naphthol 3:6:8 trisulphonic acid, beta-naphthol 1:5 disulphonic acid, naphthalene 2:6 disulphonic acid, naphthalene 1 sulphonyl chloride, alpha-naphthyl sulphamic acid, m-xylidine sulphonic acid, benzene sulphonic acid, p-toluene sulphonic acid, p-toluene sulphonyl chloride, 5-sulpho salicylic acid, p-toluidine m-sulphonic acid, benzene sulphonyl chloride, 2:5 dichlor benzene sulphonic acid, methyl ester of p-toluene sulphonic acid, ethyl chlorsulphonate) esters of inorganic acids (e. g., dimethylsulphate, triphenyl or tricresyl phosphate, nitrocresol carbonates), and inorganic salts of organic bases (e. g., m-nitroaniline hydrochloride, diaminodiphenylamine sulphate, amino-azo-benzene sulphate, diphenylamine sulphate, diphenylamine hydrochloride, diphenylamine-hydrobromide, diphenylamine trichloracetate, trichloraniline hydrochloride).

Further examples are o-nitrophenol, p-nitrophenol, p-nitro acetanilide, dinitraniline, fluoresceine, eosin, thiocarbanilide, 4:4'-diamino-diphenyl sulphide, diphenyl sulphone. Further modifying agents are certain metallic peroxides, e. g., peroxides of magnesium, zinc, barium, strontium, calcium, sodium, etc., alkali metals, their oxides and hydroxides, etc. In certain cases more than one of the modifying agents may be used such, for instance favorable results are obtained by treating the starting material with an alkali metal, its oxide or hydroxide and with a metal peroxide. The given list of modifying agents shall not be a complete one as other agents giving the desired results may be used for the said purpose. Aromatic amines, especially diamines and amines with high molecular weight, further soaps are also suitable modifying agents.

The modifying agents should be added to the starting material in a dry form (without the presence of water) and in relatively small quantities. In order to ensure complete dissolution or dispersion of the modifying agent, the operation of dissolving or dispersing the latter should be carried out under application of heat. The degree of heat necessary depends upon the nature of the substance under treatment and also of the modifying agent used. Generally temperatures from 100 to 300° C. or more will give satisfactory results. The heat treatment promotes the complete (molecular or colloidal) dissolution of the modifying agent in the substance to be treated. In some cases it may be advisable to continue the heat treatment after the dissolution or dispersion of the modifying agent is substantially complete.

I have further found that the results of the process vary with the nature and/or with the physical condition (pressure) of the gas (air or other gas) present in the reaction chamber. Thus I have found that certain given starting material which is initially liquid will become viscous only as the result of the electrolyte treatment, if the latter is effected under atmospheric pressure (e. g., in an open vessel), but solid if the gas is rarefied by the employment of a partial vacuum. In other cases the converse applies. When plus pressure was used (e. g., caused by the tension of the starting materials at higher temperatures), the results differ again from both of those of the treatments under atmospheric pressure and vacuum. Also, as to the nature of the gas present, air gives for instance a different result from another gas or mixture of gases. The pressure conditions may also be alternated during the gas treatment, which, of course may be carried out together with the dissolution or dispersion of the modifying agent in the substance to be treated or as an after-treatment.

It may be stated with reference to the action of gases that generally speaking rarification of the gases present in the reaction chamber by reduction of pressure tends to intensify their action in the process both in the case of solidification of the starting material and also in the case of liquefaction thereof.

The gas treatment may be carried out by blowing the gas through the reaction mixture or simply by passing it over the mass contained in the reaction chamber. The gas may be further produced in situ in the reaction mass by using substances which under the conditions of the reaction develop gases as desired. Such, for instance, by using peroxides, carbonates, sulphides, sulphites and the like the corresponding gases may be developed in the reaction mass.

The process as described may be made to effect a solidification or a liquefaction of the initial material. Thus, for instance, thickened products and even solid substances like hard rubber may be obtained from thin oils. Similarly I have found that resins either soft or liquid or of any intermediate stage of viscosity may be obtained from solid resins. The results, namely, solidification on the one hand, or liquefaction on the other, depends in any given case upon the conditions of the reaction, e. g., upon the duration of the heat-treatment of the material, the duration of the gas-treatment, the quantity of the dissolved modifying agent, etc. Generally speaking the products obtained were, from liquids, solid of semi-solid thermoplastic masses, and from solids, pasty or thin liquids.

If desired, the modifying agent may be produced in situ within the mass of the substance under treatment by interaction within the substance, of substances capable of reacting under the conditions of the process to produce the modifying agent wanted.

The dissolution or dispersion of the modifying agents in the starting material may be favorably influenced by the addition of certain "auxiliary agents" or "sensitisers". These fall into two groups, namely the purely inorganic (e. g., silica gel, fuller's earth), and the purely organic (e. g., formaldehyde, phenol, thiocarbanilide, benzidine, hexamethylene - tetramine, 2:3 - hydroxynaphthoic acid, α-naphthol, quinoline, pyrogallol, benzene, glycerol and phthalimide). The specific examples of auxiliary agents here mentioned are to be taken as typical of the substances which have been successfully used for this purpose and not as comprising all the effective substances. It should be mentioned that quite a number of the modifying agents comprising within the molecule and acidic inorganic residue and an organic residue are auxiliary agents (sensitisers) when used in conjunction with other modifying agents. By an acidic inorganic residue I mean such an inorganic residue as can be converted by the addition of one or more hydrogen atoms, into an inorganic acid (including carbonic acid as inorganic). Thus, e. g., the dissolution of 5% of sodium bisulphite in linseed oil is facilitated and the color of the product is made lighter by the addition of say 2% of such compounds as amino-azobenzene sulphate, aniline sulphate, nitro cresyl carbonate, dimethyl sulphate, trichloracetic acid, benzenesulphonic acid, iodoform, naphthalene tetrachloride, pinene hydrochloride, m-xylidine-sulphonic acid, β-naphthylamine-6:8-disulphonic acid, β-naphthylamine 6-sulphonic acid, acetyl chloride, p-nitroacetanilide, chloral hydrate, and triphenyl phosphate, naphthalene-1-sulphochloride, diphenylamine hydrobromide, 5-(or 3)-aminosalicyclic acid, 2:6-naphthalene disulphonic acid, o-dichlorobenzene.

The advantage of a rapid dissolution of the modifying agent are greatest in those cases where a clear, pale or colorless product is desired, especially for example, for the varnish industry.

For the modification of the physical properties of the initial materials solutions or colloidal solutions of one or more electrolytes in an organic solvent may be used.

Solid coherent and elastic products may be obtained, similar in general characteristics to ordinary rubber, by adding sulphur to the initial substance in addition to the agents already mentioned. The sulphur may be added as such or in the form of a sulphur compound (e g., sulphur chloride) which under the conditions of the process decomposes with liberation of nascent sulphur. It would appear that the action of the sulphur is analogous to that which takes place in the vulcanisation of rubber. The sulphur or sulphur compounds may be added either at the beginning of the process or so as to act only during the gas treatment part of the process. Alternatively, the sulphur or sulphur compounds may be added to the material after the main reaction of the process has been completed. Alternating treatment with sulphur dioxide and hydrogen sulphide has been found to be specially useful in certain cases. The vulcanising treatment results from the formation of sulphur in situ.

In the vulcanisation activators (e. g., zinc oxide), and accelerators, such as triphenylguanidine, mercaptobenzthiazole, tetraethylthiuram disulphide, may be advantageously used. If super-accelerators (e. g., piperidine pentamethylenedithiocarbamate, diethylammonium diethyldithiocarbamate, etc.) are added, vulcanisation occurs below 100° C.

The modified materials produced by these processes may be used in a variety of industries, e. g., in the rubber, linoleum, varnish, soap and candle industries and others.

A very important application of the new products is the manufacture of new artificial materials by emulsification of organic isocolloids. One of the emulsification processes consists in subjecting the isocolloid first to a treatment with modifying agents of the kind described and thereafter effecting further transformation by emulsification or dispersion in an aqueous medium. Or, the isocolloid may be first emulsified or dispersed in an aqueous medium and thereafter treated with one or more of the above characterised agents which are capable to modify the physical properties of the starting material. The emulsions or dispersions may be vulcanised or sulphurised by one of the above described methods. The emulsions or dispersions obtained, whether vulcanised or not, are valuable in the art for a variety of purposes. They may be for example concentrated and used for impregnation of textiles; or the disperse phase may be separated in solid form by means of the usual coagulating agents, or by drying (as, e. g., when the aqueous dispersions are used for varnishes), or it may be deposited on forms by dipping (in which case it is advantageous to cover the form with a coat containing a coagulant), or by electrophoresis; or the disperse phase may be separated from the dispersing medium by ultrafiltration. The emulsion may be used alone or in admixture with natural rubber latex or an artificially prepared emulsion of rubber, which may or may not have been previously vulcanised, in any or all of the above treatments, and for any of the purposes mentioned.

In all cases the treatment may be profitably influenced by exposing the materials undergoing treatment to oscillating energy (X-rays, ultraviolet rays, infrared rays, etc.) or by including the reaction chamber in an electric circuit.

Filling materials, pigments and the like may be added at any stage of the processes.

For many purposes it is very desirable to produce unmodified or/and modified isocolloids of predetermined solubility properties, or to obtain solutions or unmodified or/and modified isocolloids in such solvents in which they are insoluble.

I have now found that the solubility of an isocolloid, whether modified or not, in a certain medium can be greatly influenced by adding to them certain agents the characteristical feature of which is their solubility in the medium in question.

The present invention accordingly comprises a process for the modifying or influencing the solubility of isocolloids wherein unmodified or/and modified isocolloid substances undergo a treatment with certain agents which shall be called in the present specification "dissolution promoting agents" to distinguish them from the above mentioned "modifying agents". This dissolution promoting agent is to be dissolved or dispersed in the isocolloid to be treated. The dissolution or dispersion can be ensured by the application of heat and the process can be carried out under atmospheric pressure or under reduced pressure or under plus pressure. If modified isocolloids are so treated, the solution promoting agent can be added either in the modifying process itself or after the isocolloid products have undergone the modifying treatment. Certain substances which act as dissolution promoting agents are also modifying agents in the above sense, in this case the modifying treatment and the treatment for the influencing the solubility of the isocolloid may be combined in a single process. In such cases a single agent may be used which, at the same time, acts as a modifying and a solution promoting agent but, of course, also in these cases more than one agent can be used such, for instance, secondary reagents according to the above mentioned former processes can be added which promote the dispersion or dissolution of the agents added to the isocolloid or act as solution promoting agents in addition to the primary agent or in both directions.

The importance of this invention can be illustrated if a few practical examples are considered. Most thickened fatty oils, for instance, are insoluble in acetone but if I incorporate in them solubility promoting agents soluble in acetone, I obtain products which are acetone-soluble independently of their melting point or viscosity. (The melting point or the viscosity is, in the case of unmodified thickened oils, inversely proportional to their solubility.) Further I have found that the harder a solidified linseed oil product is, the more quickly do the varnishes made from this solidified oil dry. The harder solidified oils, the melting point of which is higher, yield in the most cases very viscous solutions in their solvents. For certain technical reasons it is important sometimes in the varnish trade to have oil solutions with low viscosity. According to the present invention, if I incorporate a solubility promoting agent soluble in the particular solvent in question I may obtain comparatively mobile solutions even from hard modified oils. In the above mentioned processes besides the primary modifying agents which are necessary to bring about any modification in the isocolloids, secondary reagents also are used which themselves do not modify the isocolloid when used alone but which influence the physical properties of the resulting product when used in combination with a primary modifying agent. A further important feature of the present invention is that good results can be obtained in those cases in which, while the primary reagent is insoluble in the particular solvent in question, a soluble secondary reagent is used which acts in this case as a solubility promoting agent.

A further practical example is the incorporating of fatty oils into nitrocotton solution for the manufacture of leathercloth, and for the manufacture of lacquers. In the leathercloth manufacture fatty oils are used as softeners, acting at the same time as a cheapening agent as nitrocotton is much dearer than any oil product. Most oils, however, flocculate the nitrocotton from its solutions and only castor oil, which is a comparatively dear fatty oil, has found application for mixing with nitrocotton solutions to produce leathercloth. There are three characteristics of castor oil which should be improved if possible: (1) Castor oil cannot be used to a greater extent than 2 parts castor oil to 1 part nitrocotton in mixture for leathercloth manufacture, (2) castor oil perspires from the leathercloth under 100° C. when used in greater quantities in the mixture and (3) castor oil shows bad ageing properties in leathercloth. All three drawbacks can be improved when modified castor oil is used, and further according to the present invention, it is also possible to produce a suitable fatty oil product from a cheaper oil than castor oil, for instance, linseed oil. Most modified linseed oil products are insoluble in the solvents for nitrocotton and flocculate therefore immediately the nitrocotton from its solution. When, however, a modifying agent, either primary or secondary, is used which is also a solution promoting agent, being soluble in the solvents for nitrocotton, it is possible to produce suitable modified oil products with improved properties. A harder oil with higher melting point has generally a less softening action on nitrocotton than castor oil, and could, therefore, be used in a greater proportion in the mixture with nitrocotton than 2:1, yielding in spite of this fact satisfactory results. Oil products with a higher melting point have naturally a lower perspiration tendency. It is further possible by choosing suitable modifying and/or solution promoting agents to improve also the ageing properties of the leathercloth products. Secondary reagents which improve the ageing properties of a solidified (5% NaHSO₃) linseed oil are, for instance, alpha-naphthol, pyrogallic acid, p-aminophenol hydrochloride, benzoyl chloride, cinnamic aldehyde, benzene sulpho chloride, and p-toluene sulpho chloride and to these may be added the purely inorganic thionyl chloride.

Nitrocotton lacquers have many advantages over oil varnishes but their most important drawback is the cost of their production. The replacement of some of the nitrocotton by the much cheaper oil products is a great advantage. As most oil products which give satisfactory results in varnishes flocculate the nitrocotton from its solution, the problem is not very simple. According to the present invention a large range of modified oil products can be obtained, which can easily be mixed with nitrocotton solutions to yield very satisfactory varnishes. When suitable modified oils are used, it is further possible to use cheap diluents to dilute the nitrocotton solutions, thus effecting a further reduction in cost.

A further important feature of my invention is to prepare solutions with low viscosity from modified isocolloids yielding in the concentration in question very viscous solutions which could, e. g., not be brushed, without being first diluted. In such cases the dissolution promoting agent may be dispersed in the modified isocolloid in after treatment.

My invention is illustrated but not limited by the following examples, the parts being by weight.

Example 1

100 parts of castor oil are heated together with 5 parts ammonium iodide in vacuo for 5 hours at 260° C. A dark-colored soft paste is obtained which is soluble in acetone. Ammonium iodide is soluble in acetone, whereas a castor oil treated under the same conditions with 5 parts of the acetone-insoluble lithium carbonate as modifying reagent is insoluble in acetone.

Example 2

100 parts of castor oil modified by 5 parts of barium thiocyanate under the conditions of Example 1 yields a brown mobile oil which is soluble in butyl acetate and benzene. Barium thiocyanate is soluble in butyl acetate, and moderately soluble in benzene.

Example 3

100 parts of castor oil is treated with 5 parts of cadmium iodide as described in Example No. 1. A viscous oil is obtained which is acetone-soluble (as is cadmium iodide itself).

Example 4

100 parts of castor oil are treated with 5 parts zinc bromide as described in Example 1 yielding a thick oil which is soluble in acetone as well as in butyl acetate. The reagent itself is also soluble in these solvents.

Example 5

100 parts of castor oil plus 2 parts of lithium carbonate and 5 parts of p-cresol are treated as described in Example 1. A light colored sticky paste is obtained, which is readily soluble in benzene and acetone, whereas the oil product treated with lithium carbonate is practically insoluble in these solvents.

Example 6

100 parts of castor oil and 2 parts of lithium sulphite and 5 parts of p-cresol are treated in the manner as described in Example 1. A hard solid product is obtained which is readily soluble in acetone. When carbolic acid is used instead of p-cresol, the resulting product is readily soluble in benzene. Lithium sulphite alone yields a product which is insoluble in both of these solvents.

Example 7

100 parts of castor oil is treated with 5 parts of 2:5-dichlorobenzenesulphonic acid as described in Example 1. The product is a thick viscous oil, soluble in butyl acetate, acetone and benzene. The reagent itself is also soluble in these solvents. Instead of 2:5-dichlorobenzenesulphonic acid, benzidine base (yielding a semisolid), o-nitrophenol (yielding a mobile oil), p-nitrochlorobenzene (thin brown oil), p-nitrophenol (yielding a mobile oil), p-cresol (yielding a clear viscous oil), and dichlorobenzene (yielding a mobile, light colored oil), can be used. All products are soluble in the above mentioned three solvents.

Example 8

Instead of castor oil or linseed oil as in the above examples, various other oils or resins can be treated in a similar way. Especially the resin products have technical importance as they are in their nature more readily soluble in nitrocotton solvents than oil products.

Many practical experiments have been tried. The following modified castor oil products have given, among others, satisfactory mixtures with technical nitrocotton solutions in the presence of pigments which could be spread in the usual way on fabric: castor oil modified by: ammonium iodide, ammonium chloride, benzidine base, lithium sulphite plus carbolic acid, 2:5-dichlorobenzene sulphonic acid, barium thiocyanate plus p-cresol, lithium carbonate plus p-cresol.

While polar compounds or electrolytes are generically useful in my inventions, I have found that certain sub-classes thereof are particularly advantageous for the present purposes, to wit, those which are soluble in one or more organic solvents. These sub-classes have been illustrated in detail by the specific polar compounds and examples given ante and they are but typical of the broad practice of this invention wherein such compounds are employed to obtain modified products having controlled solubility. By means of such compounds, this invention has a rather wide range of utility as demonstrated ante. The organic polar compounds given as effective for improving the solubility of my modified products in one or more organic solvents, of which those specifically mentioned are typical, may be represented by the generic formula $$X-R-Z \atop | \atop Y$$

wherein R represents an aryl or other hydrocarbon radicle and X, Y and Z are hydrogen or a group of the class consisting of Cl, $NO_2$, $NH_2$, OH, COOH or $SO_3H$, at least one such group being present. Those containing two or more such groups, including Cl, $NO_2$ or OH groups, are particularly advantageous, as illustrated; the specific ones given being illustrative, such as nitro-phenols, dichlor-benzenes, nitro-chlor-benzenes, etc. In addition to the specific embodiments given for purposes of illustration, other embodiments may be employed in the practice of the generic invention, as indicated.

What I claim is:

1. In the manufacture of modified products from fatty oils, said modified products varying from thickened viscous oils to solidified oils and being capable of dissolving in organic solvents, the process which comprises heating together a fatty oil and a polar compound soluble in said organic solvent until a modified product soluble in said solvent is produced, said polar compound being p-nitrophenol and said heating being to at least 200° C., the said modified bodied oil product so obtained being soluble in acetone, butyl acetone and benzene.

2. The process of claim 1 in which said fatty oil is castor oil.

3. In the manufacture of modified products from fatty oils, said modified products varying from thickened viscous oils to solidified oils and being capable of dissolving in organic solvents, the process which comprises heating together a fatty oil and an aryl-nitro compound soluble in said organic solvent until a modified product soluble in said solvent is produced, said products being soluble in acetone, butyl acetate and benzene.

4. The process of claim 3 wherein said aryl-nitro compound is a nitro-aryl-hydroxy compound.

5. The process of claim 3 wherein said aryl-nitro compound is a nitro-phenol.

6. In the manufacture of modified products from castor oil, said modified products being capable of dissolving in butyl acetate, acetone and benzene, the process which comprises mixing about 100 parts of castor oil with about 5 parts of para-nitro-phenol, heating the mixture to about 260° C. in vacuo until a mobile oil soluble in said solvents is produced.

7. In the manufacture of modified products from fatty oils, said modified products varying from thickened bodied oils to solidified oils and being capable of blending with organic solutions of nitrocotton, the process which comprises heating together a fatty oil, in the dry state, with a metal salt insoluble in and an aryl-hydroxy compound soluble in the solvents for nitrocotton, until a modified product soluble in said solvent is obtained, said product being soluble in acetone and butyl acetate said metal salt being lithium sulphite.

8. In the manufacture of modified products from fatty oils, said modified products varying from thickened bodied oils to solidified oils and being capable of dissolving in butyl acetate, acetone and benzene, the process which comprises mixing said fatty oil with a nitro-aryl compound soluble in said solvents, heating the mixture to a temperature between 100° and 300° C., until a substantially modified body soluble in said solvents is produced.

9. In the manufacture of modified products from castor oil, said products varying from thickened bodied oils to solidified oils and being capable of dissolving in certain organic solvents, the process which comprises mixing together castor oil with less than an equal amount of an aryl-hydroxy compound soluble in said solvents, heating the mixture to a temperature of about 260° C. under vacuo until a substantially modified product soluble in said solvents is produced, said products being soluble in acetone.

10. The process of claim 9 wherein an additional modifying agent insoluble in said solvents, is admixed with the castor oil in addition to the said aryl-hydroxy compound, said additional modifying agent being a metal salt of the class consisting of lithium carbonate and lithium sulphite.

11. In the manufacture of soluble modified organic isocolloid products from organic isocolloid substances of the class consisting of fatty oils, natural resins, synthetic resins containing natural resins, products containing acids of fatty oils and resins and their derivatives, the method which comprises adding to such organic isocolloid substance, a minor amount of a metal salt and of an aryl-hydroxy compound and heating the mixture to above 200° C. until a homogeneous, modified, soluble product is obtained, said metal salt being lithium carbonate.

12. In the manufacture of modified fatty oil products, the process which comprises adding a minor amount of a lithium salt and of cresol to castor oil and heating the mixture to above 200° C. until a bodied, modified, soluble product is obtained.

13. In the manufacture of modified fatty oil products, the process which comprises adding a minor amount of lithium sulphite and of cresol to a fatty oil and heating the mixture to above 200° C. until a bodied, modified, soluble product is obtained.

14. In the manufacture of soluble modified organic isocolloid products from fatty oils, the method which comprises adding to a fatty oil, a minor amount of lithium carbonate and of p-cresol and heating the mixture to above 200° C. until a homogeneous, modified, soluble product is obtained.

LASZLO AUER.